C. T. HENDERSON.
MOTOR CONTROLLER.
APPLICATION FILED DEC. 13, 1909.

1,057,962.

Patented Apr. 1, 1913.

Witnesses:
Robert A. Weir
Geo. Haynes

Inventor:
Clark T. Henderson
By: Edwin B. H. Towne, Jr.
Atty.

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,057,962.     Specification of Letters Patent.     Patented Apr. 1, 1913.

Original application filed September 6, 1907, Serial No. 391,597. Divided and this application filed December 13, 1909. Serial No. 532,736.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to certain improvements in motor controllers disclosed in my prior application Serial No. 391,597, filed September 6, 1907, of which the present application is a division.

My invention relates to improvements in motor controllers.

It applies particularly to controllers that are adapted to cause the motor to become a generator and act as a dynamic brake when it is disconnected from circuit and is running under the impetus it acquired while in operation. Such a result may be obtained by connecting a circuit across the armature, in which circuit is placed a resistance. The armature generates current and sends it through the circuit, which circuit may be called the braking circuit. The resistance in the braking circuit is sufficient to prevent the current from becoming so great as to endanger the armature. The braking force that is exerted by the armature depends upon its electrical load, which load is proportional to the braking current that is sent through the braking circuit. Inasmuch as the braking current decreases as the speed of the armature decreases, all other conditions remaining the same, the braking force decreases in proportion to the decrease in speed of the armature. Accordingly, there is a tendency for the period taken by the motor to come to rest to be prolonged.

One of the objects of my invention is to provide means whereby the braking current will have a high mean value throughout the period of braking the motor.

In order to attain the object of my invention, I provide means for varying the resistance in the braking circuit, which means are adapted to decrease the resistance in the braking circuit as the speed of the armature decreases, whereby the braking current is maintained at a high value throughout the braking period, and the braking period is thus reduced to a minimum. In order to prevent the resistance from being removed from circuit too rapidly, and at the same time be removed from circuit as rapidly as the conditions will allow without endangering the armature, I provide a device by means of which the progress of removing the resistance from circuit will be arrested or retarded whenever the braking current rises above a predetermined limit.

In accordance with the preferred form of my invention, I provide a plurality of electromagnetically operated resistance switches which control the resistance in the braking circuit. These switches, and also the resistances, may be the same as are used for starting the motor. The operation of these switches is so controlled that the same respond successively and thus gradually remove the resistance from circuit. In order to arrest the progressive operation of the switches, if the braking current becomes abnormal and thus prevent further removal of the resistance from circuit until the current subsides to a normal value, I provide a magnetically operated relay device that responds to the braking current, or to a condition which is controlled thereby. The relay device controls the circuits of the operating windings of the resistance switches. It is operated by a winding preferably placed in the braking circuit in series with the armature. If the braking current rises above a predetermined value, the relay device operates, and, accordingly, prevents further respondation of the operating windings of the resistance switches until the current subsides. In order to prevent the relay device from deënergizing the operating windings of the switches that have been closed, I provide means whereby, when each switch is closed, its operating winding is rendered independent of said relay device.

In order to more particularly set forth the characteristic features of my invention as the same may be embodied in practice, I have diagrammatically illustrated in the accompanying drawing a system in which my invention is exemplified.

I am, of course, aware that the objects of my invention may be attained through the agency of various instrumentalities, and the same ultimate results may be attained by various organizations of elements.

I shall now proceed to describe the system illustrated in the accompanying drawing.

I provide a plurality of resistance switches 1, 1ᵃ and 1ᵇ, which are operated by electromagnetic windings 2, 2ᵃ and 2ᵇ respectively. These switches are connected in circuit to short circuit resistance sections 3, 3ᵃ and 3ᵇ respectively. The resistance switches are provided with auxiliary contacts 4, 4ᵃ and 4ᵇ, and interlocking contacts 5, 5ᵃ and 5ᵇ. The auxiliary contact 4 controls the circuit of winding 2ᵃ, and the auxiliary contact 4ᵃ controls the circuit of winding 2ᵇ. The circuits of the windings 2, 2ᵃ and 2ᵇ and also controlled by relay switches 6, 6ᵃ and 6ᵇ respectively, which relay switches are operated by electromagnetic winding 7, which is connected in circuit in series with the motor armature.

The motor is provided with an armature $a$, and a field winding $f$. The motor circuit is controlled by means of the main switch 8, which is operated by electromagnetic winding 9. The main switch is provided with an auxiliary contact 10 and an interlocking contact 11. The braking circuit which extends across the motor armature is controlled by means of a braking switch 12, which is operated by an electromagnet 13. The braking switch 12 is provided with an auxiliary contact 14 and interlocking contact 15.

The operation of the controller is directed by means of a master switch 25, which may be of the drum type. On one side of the drum is mounted a plurality of contact segments 26, 26ᵃ and 26ᵇ. On the other side a plurality of contact segments 27, 27ᵃ and 27ᵇ. Between these segments is mounted a plurality of stationary contacts 28, 28ᵃ, 28ᵇ and 28ᶜ.

The line from which current is obtained is provided with a line switch 29. If the master controller 25 be turned to the right, segments 26, 26ᵃ and 26ᵇ will engage contacts 28, 28ᵇ and 28ᶜ respectively. Circuit will thus be closed from the positive line through conductor 30, contact 28, segment 26, segment 26ᵃ, contact 28ᵇ, conductor 31, winding 9, conductor 32, interlocking contact 15, conductor 33, interlocking contacts 5, 5ᵃ and 5ᵇ, conductor 34 and conductor 35 to the negative line. Accordingly, the main switch 8 will be closed and current will flow from the positive line through conductor 36, switch 8, conductor 37, conductor 38, armature $a$, conductor 39, series relay winding 7, resistance sections 3ᵇ, 3ᵃ and 3, conductor 40 to the negative line 35. The motor will thus be started with all the starting resistance 3, 3ᵃ and 3ᵇ in circuit with its armature. The motor field circuit extends from the positive line through conductor 30, conductor 41, shunt field winding $f$, conductor 42 to the negative line 35. When switch 8 is closed the circuit for winding 9 is completed by auxiliary switch 10 and conductor 57 connected to the negative line, thus rendering said main switch independent of said interlocking contacts 5, 5ᵃ and 5ᵇ. The motor having now been started with all the starting resistance in circuit, the switches 1, 1ᵃ and 1ᵇ will be closed successively, thereby removing the resistance sections 3, 3ᵃ and 3ᵇ from circuit, one after the other. The operating magnets 2, 2ᵃ and 2ᵇ of the resistance switches are all connected to the positive line through the master switch which establishes a circuit leading from the positive line by conductor 30, through contact 28, segment 26, segment 26ᵇ, contact 28ᶜ, conductor 44, to one of the terminals of each of the windings 2, 2ᵃ and 2ᵇ. The winding 2 is connected to the negative line through conductor 45, relay switch 6, conductors 46 and 34 to the negative line. Accordingly, resistance switch 1 will be closed first, thereby short circuiting resistance section 3, the short circuit around said resistance section extending through conductor 47 and resistance switch 1. If the motor current be abnormal before the resistance switch 1 is closed the series relay magnet 7 will respond and open the relay switches. Accordingly, the circuit of winding 2 will be opened by relay switch 6 until the surge of current subsides, whereby resistance switch 1 will be prevented from closing so long as the current remains abnormal. When resistance switch 1 is closed, the auxiliary switch 4 is closed, thereby connecting winding 2ᵃ to the negative side of the line by a circuit leading through conductor 48, relay switch 6ᵃ, conductor 49, auxiliary switch 4, resistance switch 1 to the negative side of the line. If the current be abnormal after resistance section 3 is removed from circuit, the series relay magnet 7 will again respond. The circuit of winding 2ᵃ will thus be opened by relay switch 6ᵃ. Hence, resistance switch 1ᵃ will not close. As soon as the current becomes normal again relay switch 6ᵃ will be closed, and, accordingly, winding 2ᵃ will become energized and close resistance switch 1ᵃ. When resistance switch 1 is closed, it causes auxiliary contact 4 to connect winding 2 to the negative line through said auxiliary switch 4 and resistance switch 1, and, accordingly, relay switch 6 is short circuited, whereby winding 2 is rendered independent of said relay switch. In consequence, the resistance switch 1, when once closed, will remain closed, notwithstanding the opening of relay switch 6, when the current again becomes abnormal. When resistance switch 1ᵃ closes, its auxiliary contact connects winding $2^b$ to the negative line through conductor 50, relay switch $6^b$, conductor 51, auxiliary contact $4^a$, resistance switch $1^a$ and conductor 34. The auxiliary contact $4^a$ connects winding $2^a$ directly to the negative line through resistance switch $1^a$. Accordingly, relay switch $6^a$ is short circuited and said winding $2^a$ is rendered independent of said relay switch. When resistance switch $1^b$ is closed, its winding $2^b$ is connected directly to the negative line, through auxiliary switch $4^b$ and resistance switch $1^b$, and, accordingly, relay switch $6^b$ is short circuited and said winding is rendered independent of said relay switch.

When the resistance switches 1, $1^a$ and $1^b$ are closed, interlocking switches 5, $5^a$ and $5^b$ are opened. The purpose of the interlocking contacts will be hereinafter set forth.

If it is desired to stop the motor, the master controller 25 is turned to the left, so that contacts 28, $28^a$ and $28^c$ are engaged by contacts 27, $27^a$ and $27^b$ respectively. When contact $28^c$ passes from segment $26^b$ to segment $27^b$, the controlling circuit leading to the operating windings 2, $2^a$ and $2^b$ of the resistance switches will be opened. Accordingly, these switches will be opened and the resistance 3, $3^a$ and $3^b$ will be placed in circuit. The braking switch 12 will now be closed by winding 13, which winding will be connected in a circuit leading from the positive line through conductor 30, contact 28, segment 27, segment $27^a$, contact $28^a$, conductor 52, winding 13, conductor 53, interlocking switch 11, and conductors 54 and 33, interlocking switches 5, $5^a$ and $5^b$, conductors 34 and 35 to the negative line. When braking switch 12 is closed, the circuit through the winding 13 thereof is completed by auxiliary switch 14, switch 12 and conductor 56 to the negative line, thereby rendering said braking switch independent of interlocking switches 5, $5^a$ and $5^b$. A closed circuit or loop in which is arranged the resistance 3, $3^a$ and $3^b$ is thus connected across the terminals of the armature, which circuit extends from one terminal of the armature through conductor 38, conductor 37, conductor 55, switch 12, conductor 56, conductor 35, resistance 3, $3^a$ and $3^b$, winding 7, conductor 39 to the other terminal of the armature. The motor will now become a generator, owing to the fact that its armature $a$ will continue to rotate for a while owing to the impetus it acquired while the motor was in operation. Accordingly, the armature will send current through the closed loop, including the resistance. Such action causes the motor to act as a dynamic brake, and, accordingly, the armature will be quickly and smoothly brought to rest. The braking force that is exerted by the armature is proportional to its electrical load, which load depends upon the current which may flow through the closed loop. As the speed of the armature decreases, the braking current in the closed loop naturally tends to decrease, and in consequence, the braking force exerted by the armature tends to decrease. Inasmuch as the windings 2, $2^a$ and $2^b$ are connected to the positive line through a path leading to said line through conductor 30, contact 28, segment 27, segment $27^b$, contact $28^c$ and conductor 44, the switches 1, $1^a$ and $1^b$ will be closed successively in the same manner as previously described, thereby removing the resistance sections 3, $3^a$ and $3^b$ from circuit as the speed of the armature $a$ decreases. Accordingly, the braking current will be kept at a high value throughout the braking period, whereby the time of this period will be shortened. The series relay magnet 7 serves to open the relay switches and arrests the progressive operation of the resistance switches if the resistance is removed from circuit too rapidly and the braking current becomes too great. If the braking current is abnormal before resistance switch 1 closes, the series relay magnet responds and thus prevents said resistance switch from closing until the current falls below a predetermined point. If after the switch 1 closes, the current again becomes abnormal, the series relay magnet 7 will respond and prevent the switch $1^a$ from closing so long as the current remains abnormal, and so on, the resistance switches operating successively and having the progressive operations thereof arrested whenever the current becomes abnormal. Accordingly, the braking current will be prevented from rising above a predetermined limit, and at the same time will be proportioned at a high value throughout the braking period, thereby reducing the time required to bring the armature to rest.

Inasmuch as the interlocking switches 5, $5^a$ and $5^b$ are arranged in the circuits of the operating windings 9 and 13, it will be impossible for the braking switch 12 or the main switch 8 to close, unless the resistance switches 1, $1^a$ and $1^b$ are open. Accordingly, neither the motor circuit nor the braking circuit can be closed unless the resistance 3, $3^a$ and $3^b$ is first included in the armature circuit. Furthermore, inasmuch as the interlocking switch 15 is in the circuit of the operating winding 9 and interlocking switch 11 is in the circuit of the operating winding 13, it will be impossible for the main switch 8 to be closed unless the braking switch 12 is open, and also it will be impossible for the braking switch 12 to be closed unless the main switch 8 is open.

The use of the motor as a dynamic brake is advantageous because of the fact that it is not subjected to wear during the braking action, and, accordingly, does not require adjustment in order to bring the load to rest in a given period.

I am, of course, aware that my invention is capable of application in various relations and that it may be used on various classes of machinery where it is necessary to use a brake in bringing the machine to rest, as is usually the case with machines that have to be started and stopped at frequent intervals.

Having thus described my invention, what I desire to secure by Letters Patent, is:—

1. In a controller for stopping an electric motor, in combination, a variable resistance connected in circuit with the motor armature, means for automatically removing said resistance from circuit gradually as the armature speed decreases, and means for arresting the removal of said resistance from circuit when the current rises above a predetermined value.

2. In a controller for stopping a motor, in combination, a variable resistance connected across the terminals of the motor armature, means for automatically removing said resistance from circuit gradually as the armature speed decreases, and means for arresting the removal of said resistance from circuit when the armature current rises above a predetermined value.

3. In a controller for stopping a motor, in combination, a variable resistance connected across the terminals of the motor armature, a plurality of automatically controlled switches adapted to operate successively and to remove said resistance from circuit gradually as the armature speed decreases, and means for arresting the progressive operation of said switches when the armature current rises above a predetermined value.

4. In a controller for stopping a motor, in combination, a variable resistance connected across the terminals of the motor armature, a plurality of electromagnetically operated switches for removing said resistance from circuit gradually as the armature speed decreases, means connected with each of said switches for closing the circuit through the winding of the succeeding switch, and means for arresting the progressive operation of said switches when the current rises above a predetermined value.

5. In a controller for stopping a motor, in combination, a variable resistance connected across the terminals of the motor armature, means for automatically removing said resistance from circuit as the armature speed decreases, and a throttling device responsive to the armature current for arresting the removal of said resistance from circuit when the armature current rises above a predetermined value.

6. In a controller for stopping a motor, in combination, a variable resistance connected across the terminals of the motor armature, a plurality of electromagnetically operated switches for removing said resistance from circuit gradually as the speed of the armature decreases, and a throttling device associated with said switches and responsive to the armature current for arresting the progressive operation of said switches when the current rises above a predetermined value.

7. In a controller for stopping a motor, in combination, a variable resistance connected across the terminals of the motor armature, a plurality of electromagnetically operated switches for removing said resistance from circuit gradually as the armature speed decreases, means actuated by the closing of each switch for closing the circuit through the winding of the succeeding switch, and a throttling device responsive to the armature current and adapted to open the circuits through the windings of the switches which have not been closed when the armature current rises above a predetermined value.

8. In a controller for stopping an electric motor, in combination, means for disconnecting the motor from circuit, means for connecting a variable resistance across the terminals of the armature, means for automatically removing said resistance from circuit gradually as the armature speed decreases, and means for arresting the removal of said resistance from circuit when the armature current rises above a predetermined value.

9. In a controller for stopping an electric motor, in combination, means for disconnecting the motor from circuit, means for connecting a variable resistance across the terminals of the armature, means for automatically removing said resistance from circuit gradually as the speed of the armature decreases, and a throttling device responsive to the armature current for arresting the removal of said resistance from circuit when the armature current rises above a predetermined value.

10. In a controller for stopping an electric motor, in combination, electroresponsive means for disconnecting the motor from circuit, electroresponsive means for connecting a variable resistance across the terminals of the armature, a master controller for controlling said electroresponsive means, means for removing said resistance from circuit as the armature speed decreases, and means for arresting the removal of said resistance if the armature current rises above a predetermined value.

11. In a controller for stopping an electric motor, in combination, means for disconnecting the motor from circuit, means for connecting a variable resistance across the terminals of the motor armature, a plurality of electromagnetically operated switches, electrical connections between said switches for causing the same to operate successively to remove said resistance from circuit, and a throttling device responsive to the armature current for arresting the progressive operation of said switches when the armature current rises above a predetermined value.

12. In a controller for starting and stopping an electric motor, in combination, a variable resistance, means for connecting said resistance in series with the motor armature, means for connecting said resistance across the terminals of the motor armature, means for automatically removing said resistance from circuit gradually, and means for arresting the removal of said resistance from circuit if the armature current rises above a predetermined value while said resistance is connected in either relation with the motor armature.

13. In a controller for starting and stopping an electric motor, in combination, a variable resistance, means for connecting said resistance in series with the motor armature, means for connecting said resistance across the terminals of the motor armature, means for automatically removing said resistance from circuit gradually, and a throttling device responsive to the armature current for arresting the removal of said resistance from circuit when connected in either relation to the armature.

14. In a controller for starting and stopping an electric motor, in combination, a variable resistance, means for connecting said resistance in series with the armature, means for connecting said resistance across the terminals of the armature, a plurality of electromagnetically operated switches adapted to operate successively to remove said resistance from circuit gradually, and a throttling device responsive to the armature current for arresting the successive operation of said switches when said resistance is connected in either relation to the motor armature.

15. In a controller for starting and stopping an electric motor, in combination, a variable resistance, means for connecting said resistance across the terminals of the motor armature, means for connecting the motor to a source of supply, a master controller for said means, means for removing said resistance from circuit gradually, and means for arresting the removal of said resistance from circuit when the armature current rises above a predetermined value.

16. In a controller for starting and stopping an electric motor, a variable resistance, means for removing said resistance from circuit gradually, means for arresting the removal of said resistance from circuit if the armature current rises above a predetermined value, means for connecting said resistance in series with the motor armature, means for connecting said resistance across the terminals of the armature, and interlocking means necessitating the breaking of one of said connections before the other of said connections is made.

17. In a controller for starting and stopping an electric motor, a variable resistance, means for removing said resistance from circuit gradually, a throttling device responsive to the armature current for arresting the removal of said resistance from circuit if the armature current rises above a predetermined value, means for connecting said resistance in series with the motor armature, means for connecting said resistance across the terminals of the armature, a master switch controlling both of said connecting means, and interlocking means necessitating the breaking of one of said connections before the other of said connections is made.

18. In a controller for stopping an electric motor, in combination, means for disconnecting the motor armature from circuit, means for connecting a variable resistance across the terminals of the armature, a master controller for controlling said means, an interlock between said means necessitating the disconnecting of the motor armature from circuit before said resistance is connected across the terminals of the armature, means for removing said resistance from circuit as the armature speed decreases, and means for arresting the removal of said resistance when the armature current rises above a predetermined value.

19. In a controller for starting and stopping an electric motor, in combination, a variable resistance, a plurality of electroresponsive devices for removing said resistance from circuit gradually, a throttling device responsive to the armature current for arresting the removal of said resistance when the armature current rises above a predetermined value, electroresponsive means for connecting said resistance in series with the motor armature, electroresponsive means for connecting said resistance across the terminals of the armature, a master switch for controlling said electroresponsive means, and means operated by each of said electroresponsive means whereby when one of said electroresponsive means is operated, circuit through the other of said electroresponsive means will be opened.

20. In a controller for starting and stopping an electric motor, in combination, a variable resistance, electroresponsive devices for removing said resistance from circuit gradually, a throttling device responsive to the armature current for arresting the removal of said resistance when the armature current rises above a predetermined value, electroresponsive means for connecting said resistance in series with the motor armature, electroresponsive means for connecting said resistance across the terminals of the armature, a master switch for controlling said electroresponsive means, means operated by each of said electroresponsive means whereby, when one of said electroresponsive means is operated, the other will be inoperative, and means controlled by said resistance removing devices whereby neither of said connections can be made unless all of the resistance is in circuit.

21. In a controller for starting and stopping an electric motor, in combination, a variable resistance, a plurality of electromagnetically operated switches for removing said resistance from circuit gradually, a series relay switch for preventing the progressive operation of said switches when the armature current rises above a predetermined value, a main switch for connecting said resistance in series with the armature, a braking switch for connecting said resistance across the terminals of the armature, and a master switch for controlling said main switch and said braking switch.

22. In a controller for starting and stopping an electric motor, in combination, a variable resistance, a plurality of electromagnetically operated switches for removing said resistance from circuit gradually, a series relay switch for preventing the progressive operation of said switches when the armature current rises above a predetermined value, a main switch for connecting said resistance in series with the motor armature, a braking switch for connecting said resistance across the terminals of the armature, and interlocking means for preventing the operation of the braking switch or of said main switch unless all of said resistance is in circuit.

23. In a controller for starting and stopping an electric motor, in combination, a variable resistance, a plurality of electromagnetically operated switches for removing said resistance from circuit gradually, a series relay switch for preventing the progressive operation of said switches when the armature current rises above a predetermined value, a main switch for connecting said resistance in series with the motor armature, a braking switch for connecting said resistance across the terminals of the armature, interlocking means whereby, when either said braking switch or said main switch is energized, the other of said switches is deënergized.

24. In a controller for starting and stopping an electric motor, in combination, a variable resistance, a plurality of electromagnetically operated switches for removing said resistance from circuit gradually, a series relay switch for preventing the progressive operation of said switches when the armature current rises above a predetermined value, a main switch for connecting said resistance in series with the motor armature, a braking switch for connecting said resistance across the terminals of the armature, interlocking means between said braking switch and said main switch, whereby neither can be energized unless the other is deënergized, and means necessitating the insertion of all of said resistance in circuit before either of said switches can be energized.

25. In a controller for starting and stopping an electric motor, in combination, a variable resistance, a plurality of electromagnetically operated switches for removing said resistance from circuit gradually, a series relay switch for preventing the progressive operation of said switches when the armature current rises above a predetermined value, a main switch for connecting said resistance in series with the motor armature, a braking switch for connecting said resistance across the terminals of the armature, an interlocking means between said main switch and said braking switch, whereby neither of the same can be operated unless the other is inoperative, means necessitating the insertion of all of said resistance in circuit before either of said switches can be actuated, and a master switch for controlling said braking switch and said main switch.

26. In a controller for starting and stopping an electric motor, in combination, a resistance, a main switch for connecting the motor to a source of electrical energy, and also connecting said resistance in series with the motor armature, a braking switch for connecting said resistance across the motor armature, means for removing said resistance from circuit, and interlocking means for preventing either of said switches from being closed unless said resistance is first included in circuit.

27. In a controller for stopping electric motors, in combination, means for establishing a dynamic braking circuit across the terminals of the motor armature and insuring disconnection of the motor from its source of supply prior to the establishment of said braking circuit, means insuring a predetermined resistance for said dynamic braking circuit when first established and thereafter automatically reducing the resistance of said circuit gradually and a current responsive relay device governing the operation of said last mentioned means.

28. In a controller for stopping electric motors, in combination, means for establishing a dynamic braking circuit across the terminals of the motor armature and insuring disconnection of the motor from its source of supply prior thereto, a variable resistance for said circuit and electroresponsive means adapted upon responding to gradually decrease said resistance and means associated with said first mentioned means to insure deënergization of said electroresponsive means prior to the establishment of said braking circuit to insure a predetermined resistance for said braking circuit when first established.

29. In a controller for stopping electric motors, the combination with means for connecting a variable resistance across the motor armature, a plurality of electromagnetic switches adapted to be successively energized to gradually remove said resistance from circuit, and means controlling the energization of said switches to prevent too rapid removal of said resistance from circuit.

In witness whereof, I have hereunto subscribed my name in the presence of two witnesses.

CLARK T. HENDERSON.

Witnesses:
  FRANK H. HUBBARD,
  S. W. FITZ GERALD.